(No Model.)

J. C. DODGE.
HAMMOCK AND COT.

No. 268,783. Patented Dec. 12, 1882.

WITNESSES
Willard L. Fogg.
Fred. Harris

INVENTOR
John C. Dodge
by his attys
Clarke & Raymond

UNITED STATES PATENT OFFICE.

JOHN C. DODGE, OF BOSTON, MASSACHUSETTS.

HAMMOCK AND COT.

SPECIFICATION forming part of Letters Patent No. 268,783, dated December 12, 1882.

Application filed July 12, 1882. (No model.)

*To all whom it may concern:*

Be it known that I, JOHN C. DODGE, of Boston, in the State of Massachusetts, have invented an Improved Hammock and Cot, of which the following is a specification.

This invention relates to those swinging bed-bottoms which are called "hammocks" or "cots." The hammock has no determinate ends or sides; but the occupant is more or less inclosed by the "bagging" of the suspended net or canvas under the pressure of the body. The cot has determinate ends and sides, and is usually made as a canvas box with stretchers at each end.

The materials hitherto in use for hammocks and cots have been cords, either meshed like fish-nets or interwoven without knotting, or with only slight knotting, as in the original hammocks of the Caribs and South American tribes, now called "Carthagena," "Guayaquil," "Maracaybo," or "grass" hammocks, or of canvas with eyelet-holes for the suspension-ropes and with sewed or riveted seams or hems.

My invention consists in combining longitudinal flexible cords with transverse slats, spreaders, and suspension-bridles, so as to make a flexible bed-bottom, which may or may not have ends and sides.

Figure 1:
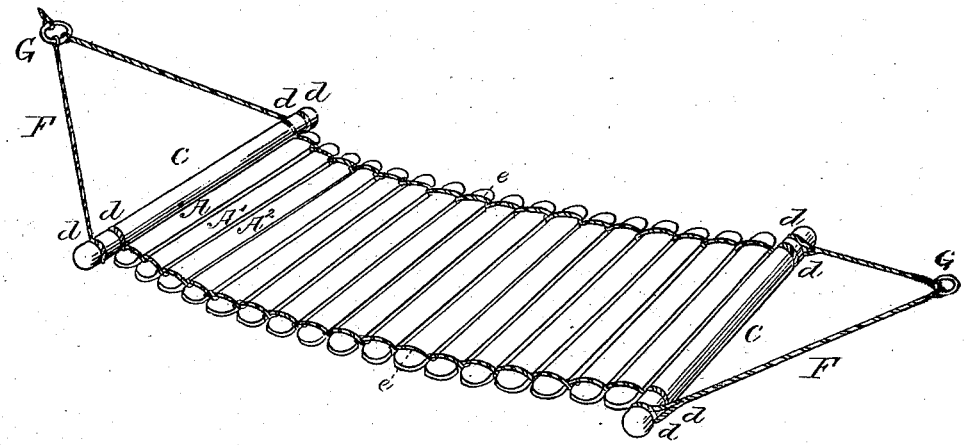
Figure 2:
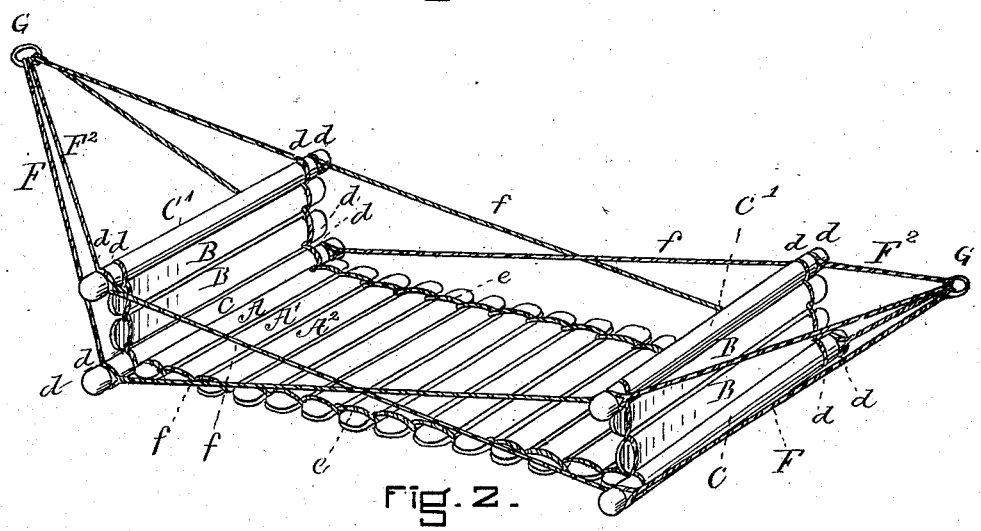
Figure 3:
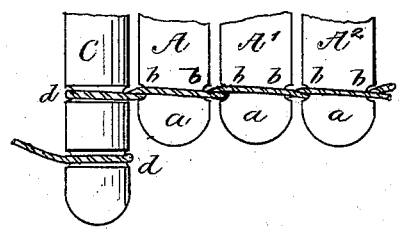

In the drawings, Figure 1 is a perspective of my invention in the form of a hammock. Fig. 2 is a perspective of the same invention in the cot form; and Fig. 3 is a plan detail of the ends of slats and spreader, showing the best method of applying the uniting-rope.

Like letters indicate like parts in all the figures.

In the best method of making this hammock I prepare slats as follows: I take two-inch spruce or other stout boards and cut them to suitable length for the width of the hammock, and with a molding-machine round the edges of the ends, as shown in Fig. 3 at *a*. This may be done in an ordinary molding-machine. I then groove the upper and lower surfaces of the boards near their ends, as shown at *b*, Fig. 3, and next slit the board into slats about a quarter-inch thick, so that these grooves *b* shall be on their edges. I then chamfer the corners and plane the surfaces of these slats. I then turn two or more spreaders, C C', and groove them near their ends, as shown at *d d*, Figs. 1, 2, and 3. Passing the bight of a rope, *e*, into one of these grooves *d*, I cross the parts and place the notches *b* of slat A against the crossed rope, carry one part of the rope over and the other under the slat, the rope lying in the notches *b*, and again cross the parts, and repeat this with slats A' and A², and so on, and do the same on the other side. When the slatted part of the hammock is long enough I bring the rope around the groove *d* of another spreader and unite the ends by splicing, lapping, and binding, or other usual way.

Two pieces of rope may be used instead of one, and their ends may pass through holes in the spreaders and be fastened by knots or clamps in any usual way.

Holes may be made in the slats, in addition to the notches in their ends; but for a neat job the notches are desirable, that the slats may lie close together without large cracks, which would serve to pinch the occupant as he moved in the hammock.

A bridle, F, is fastened to the spreaders C to suspend the hammock as desired. This bridle should be either in two parts, united to a ring, or should have an eye formed at its bight, either by the eye-splice of a lanyard looped in or by a lanyard knotted to the bight by a bowline or other suitable knot. When the cot form is desirable, additional slats, B B', are added at each end, together with another spreader, C', and the upper spreaders of each end are united to the lower spreaders of the other end by side lines, *f*, and a secondary bridle, F², shorter than the bridle F, unites the ends of the upper spreader to the lanyard eye or ring G.

It will probably be convenient to pass the ends of the bridles F F² through holes in the spreaders C, and perhaps also to do the same with the side lines, *f*—at least at one end; but the details of the method of fastening the ends of the cords *e f* F F² to the spreaders are not material, so long as the work is done securely.

The sides may be made ornamental by increasing the number of side ropes and leading them to slats, and by weaving the sides in ornamental pattern, without departing from the invention described.

The bringing of the slats and spreaders together by locked staples or eyes or by ring and pintle connections in recesses in the sides of the slats is so obviously similar to what I have above described, and the use of wire in lieu of rope so clearly indicated to the mechanic by the above description, that it is hardly necessary to allude to them as equivalents.

The ropes $e$ should receive a half-turn with the lay at every intersection, so as to get the best results. A pretty good cot may be obtained even if the bridle F of Fig. 2 be omitted.

I am aware of the patent to Moore, No. 254,677, dated March 7, 1882, and do not claim the construction therein described and claimed.

I claim and desire to secure by Letters Patent—

1. The combination of ropes $e$, notched slats A A' $A^2$, &c., spreaders C, and suspension cords or bridles F, substantially as described.

2. The combination of ropes $e$, notched slats A A' $A^2$, &c., spreaders C', bridles $F^2$, and side lines, $f$, substantially as described.

3. The combination of ropes $e$, notched slats A A' $A^2$, &c., spreaders C C', bridles F $F^2$, and side lines, $f$, substantially as described.

JOHN C. DODGE.

Witnesses:
 F. F. RAYMOND, 2d,
 WILLARD C. FOGG.